Nov. 19, 1929.  H. R. RICARDO  1,735,975

SLEEVE VALVE INTERNAL COMBUSTION ENGINE

Filed Aug. 6, 1928    2 Sheets-Sheet 1

INVENTOR
Harry R. Ricardo
By Watson, Coit, Morse & Grindle
Attys

Patented Nov. 19, 1929

1,735,975

UNITED STATES PATENT OFFICE

HARRY RALPH RICARDO, OF LONDON, ENGLAND

SLEEVE VALVE INTERNAL-COMBUSTION ENGINE

Application filed August 6, 1928, Serial No. 297,787, and in Great Britain August 26, 1927.

This invention relates to four-cycle internal combustion engines of the kind in which the inlet and exhaust ports are controlled by a single sleeve valve having a combined oscillating and reciprocating motion. In such engines the charge enters the cylinder more or less tangentially owing to the lateral motion of the sleeve while opening the inlet ports, and thus causes the charge to swirl or rotate about the cylinder axis. This "charge swirl" has been found to have a profound influence on the process of combustion and the object of the present invention is to control this swirl so as to produce the best results.

While a certain amount of swirl is advantageous in that it reduces detonation, too much swirl gives trouble through centrifugal separation of the liquid fuel in the charge and excessive heat loss which inhibits the rapid spread of the flame.

According to the present invention the passages of each cylinder leading the charge to the inlet ports in the cylinder wall are so formed as to reduce to a suitable value this tendency of the charge to rotate about the cylinder axis. Conveniently this may be effected by so disposing the passages that the charge approaches the ports with a tangential flow in a direction opposite to that of the natural swirl. Alternatively guides or baffles may be provided in the passages or ports which induce the charge to enter the cylinder in a more or less radial direction.

In the case of multi-cylinder engines constructed according to this invention the inlet passages of each individual cylinder or the inlet ports of each cylinder are constructed and arranged as above described so that the swirl in every cylinder is reduced to the required extent and therefore the performance of the engine as a whole is improved.

Figure 1:
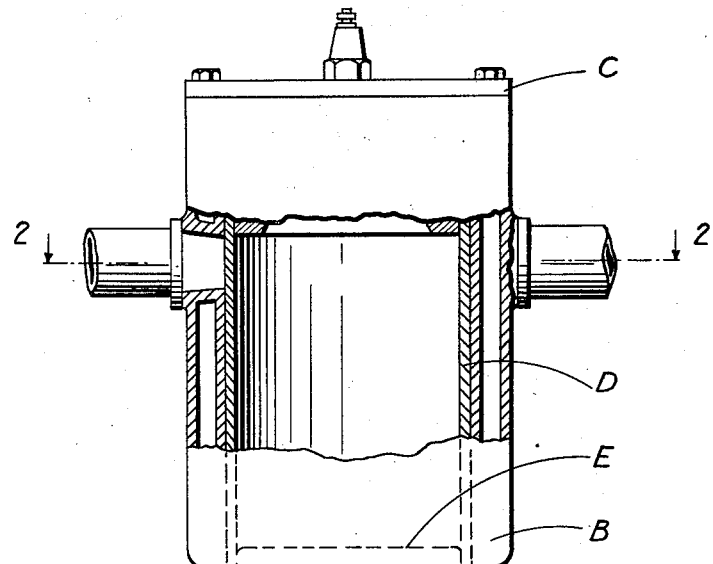
Figure 1:
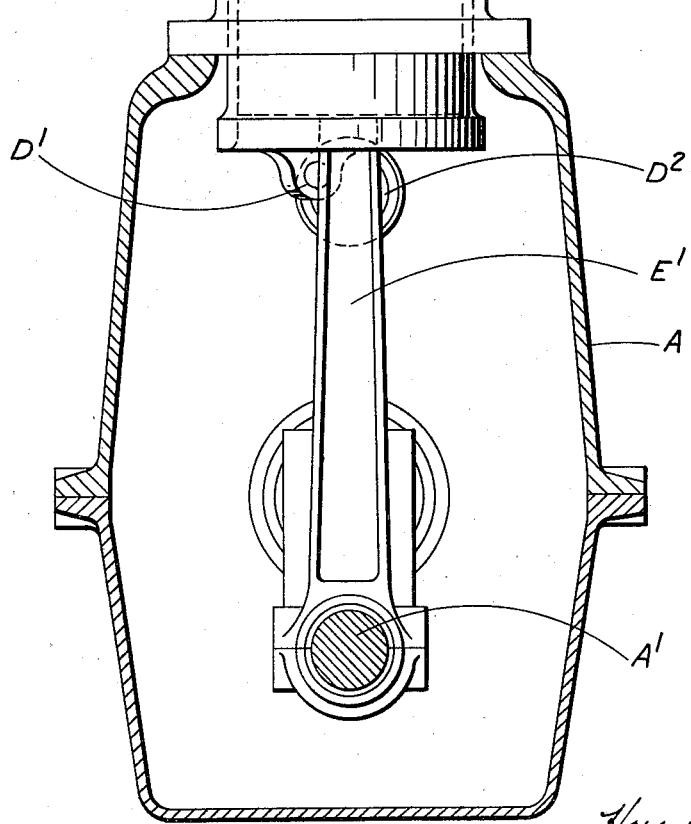
Figure 2:
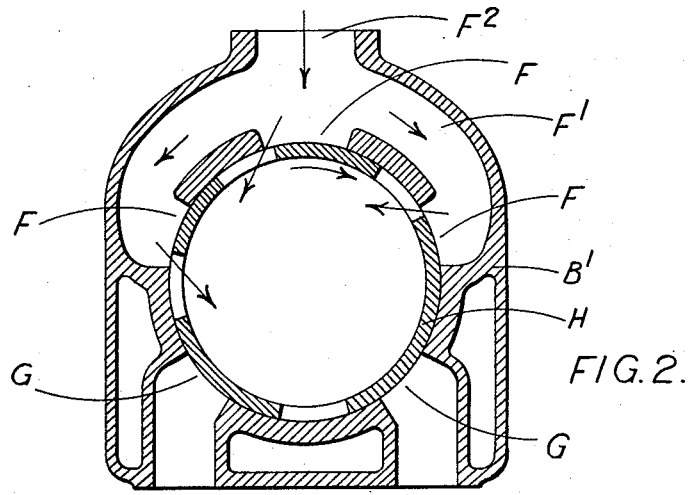
Figure 3:
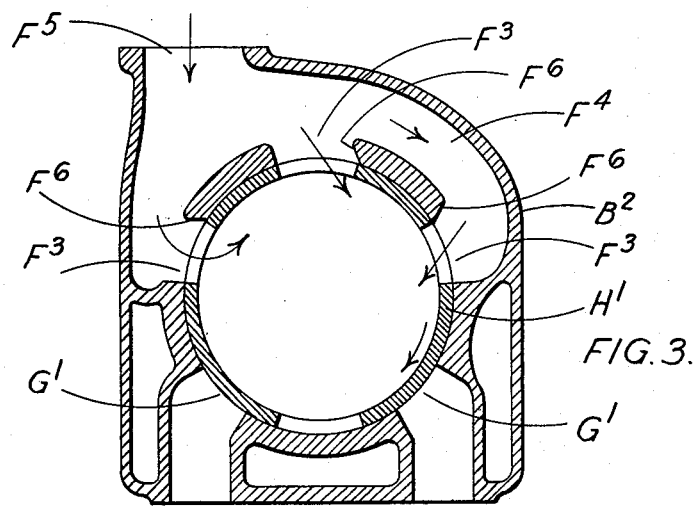
Figure 4:
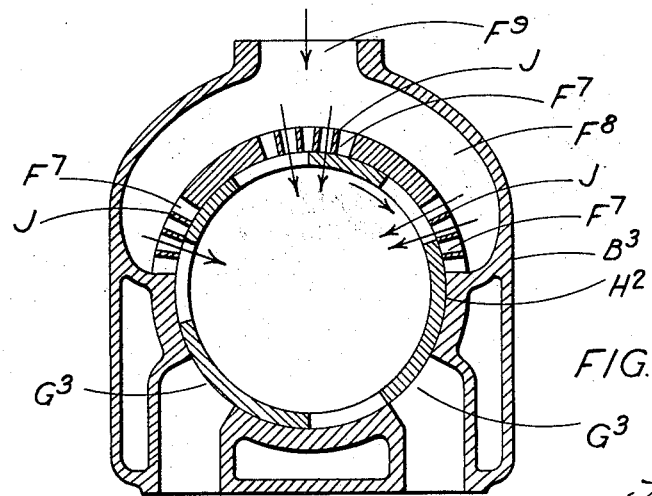

The invention may be carried into practice in various ways but two alternative constructions according to this invention are illustrated by way of example in the accompanying drawings, in which Figure 1 is an elevation partly in section of an engine of the kind to which the present invention is applicable, Figure 2 shows a section on the line 2—2 of Figure 1 of an engine having the inlet ports arranged in known manner, showing how in prior constructions excessive swirling of the charge about the combustion chamber axis is caused, Figure 3 shows a similar view to Figure 2 of one arrangement of inlet ports according to the present invention, and Figure 4 is a similar view to Figure 2 of another arrangement of ports according to the present invention.

In the construction illustrated in Figure 1, the engine comprises a crank case A containing a crankshaft $A^1$ and having mounted thereon a water-cooled cylinder B, the cylinder B being closed at its upper end by a plug-like cylinder head C. Disposed within the cylinder B is a sleeve valve D to which is imparted in known manner a combined oscillating and reciprocating motion by a crank pin $D^1$ on a lay shaft $D^2$ driven from the crankshaft at half crankshaft speed by suitable gearing. A piston E connected to the crankshaft $A^1$ by a connecting rod $E^1$ reciprocates within the cylinder B.

In engines of this type the inlet ports open laterally when the motion of the sleeve is mainly oscillating. Thus in the known arrangement of inlet ports shown in Figure 2 wherein a cylinder $B^1$ is provided with three inlet ports F communicating through a common passage $F^1$ with a central inlet opening $F^2$, and controlled by a sleeve valve H which also controls two exhaust ports G, the charge enters the cylinder through the ports F with a tangential component opposite to that of the sleeve motion during the opening period as indicated by arrows, with the result that an undesirably rapid rotation of the charge about the cylinder axis tends to take place. When the inlet ports are fully opened there is no tendency for the charge to enter tangentially through the central port F but there is a tendency for the charge to enter tangentially through the two side ports F. The tangential components of the flow through these side ports, however, are equal and opposite so that on the whole at this period of the opening of the valve there is no tendency to set up a swirl. There is, however, little or no tendency also to check the swirl set up during the initial opening period of the inlet ports with the result that at the end of the inlet period the charge tends to rotate about the cylinder axis with undesirable rapidity.

In the construction according to this invention illustrated in Figure 3 wherein the arrangement is such as to tend to check this excessive swirl, the engine comprises a cylinder $B^2$ containing a sleeve valve $H^1$ controlling three inlet ports $F^3$ and two exhaust ports $G^1$ arranged in a similar manner to the ports F and G in the construction shown in Figure 2. In the arrangement shown in Figure 3, however, the three inlet ports $F^3$ communicate through a passage $F^4$ with an opening $F^5$ situated nearer one end of this passage than the other so that as indicated by arrows, a greater part of the charge tends to enter the cylinder during the later parts of the inlet period in such a direction as to counteract the swirl normally set up during the earlier part of the inlet opening period. Further, the inlet ports $F^3$ are conveniently formed with inclined edges or an overhanging lip as indicated at $F^6$ so as to assist this counteracting flow.

With this arrangement it will be seen that while during the initial opening of the inlet ports a swirl will tend to be set up about the axis of the combustion chamber, during the later portions of the inlet port opening, the charge will pass through the inlet ports in a direction tending to counteract or check the swirl initially set up whereby the speed of rotation of the charge about the cylinder axis at the end of the inlet period will tend to be reduced to a desirable value.

In the alternative arrangement according to this invention shown in Figure 4, the cylinder $B^3$ is provided with three inlet ports $F^7$ communicating through a chamber $F^8$ with an inlet opening $F^9$ and two exhaust ports $G^2$, all these ports as well as the passage $F^8$ and opening $F^9$ being arranged substantially as in the construction shown in Figure 2. The ports are controlled by a sleeve valve $H^2$.

In the arrangement shown in Figure 4, however, a series of guide vanes J extend across the inlet ports $F^7$, these guide vanes being substantially radial with respect to the cylinder axis so as to tend to cause the charge entering the cylinder through these ports to do so substantially radially whereby the tendency for the charge to rotate about the cylinder axis is reduced. Alternatively, the vanes may be set obliquely so as to induce a swirl which will tend to counteract any natural swirl which may be set up within the cylinder during the earlier portion of the opening period of the inlet ports.

The vanes J may be cast integral with the cylinder or may be made of sheet metal and subsequently placed in position.

It is to be understood that the constructions described above are given by way of example only and that they may be modified in various ways without departing from this invention.

What I claim as my invention and desire to secure by Letters Patent is:—

1. A four-cycle internal combustion engine including in combination a cylinder having inlet and exhaust openings in its wall, a sleeve valve disposed within the cylinder and having ports therein adapted to register with the inlet and outlet openings respectively during the inlet and exhaust periods, means for imparting to the sleeve a combined oscillating and reciprocating motion such that the inlet ports commence to register with the inlet openings when the motion of the sleeve is mainly oscillatory, and means for leading the charge through the inlet openings in such a direction as to counteract at least partially the rotation of the charge about the cylinder axis which tends to be produced during the initial opening period of the inlet ports.

2. A four-cycle internal combustion engine including in combination a cylinder having inlet and exhaust opening in its wall, a sleeve valve disposed within the cylinder and having ports therein adapted to register with the inlet and outlet openings in the cylinder respectively during the inlet and exhaust periods, means for imparting to the sleeve a combined oscillating and reciprocating motion such that the inlet ports commence to register with the inlet openings when the motion of the sleeve is mainly oscillatory, the formation of the inlet openings being such as to tend to cause the charge to pass therethrough at least during the later portions of the inlet period in such a direction as to counteract the rotational motion of the charge about the cylinder axis which tends to be produced during the initial opening period of the inlet ports.

3. A four-cycle internal combustion engine including in combination a cylinder having inlet and exhaust openings in its wall, a sleeve valve disposed within the cylinder and having ports therein adapted to register with the inlet and outlet openings in the cylinder respectively during the inlet and exhaust periods, means for imparting to the sleeve a combined oscillating and reciprocating motion such that the inlet ports commence to register with the inlet openings when the motion of the sleeve is mainly oscillatory, and a passage leading the charge to at least the majority of the inlet openings in such a manner that the charge approaches the openings in a direction having a tangential component opposite to that which tends to be imparted to the charge within the cylinder during the initial opening period of the inlet ports.

4. A four-cycle internal combustion engine including in combination a cylinder having inlet and exhaust openings in its wall, a sleeve valve disposed within the cylinder and having ports therein adapted to register with the inlet and outlet openings in the cylinder respectively during the inlet and exhaust periods, means for imparting to the sleeve a combined oscillating and reciprocating motion such that the inlet ports commence to register with the inlet openings when the motion of the sleeve is mainly oscillatory, and a passage leading the charge to at least the majority of the inlet openings in such a manner that the charge approaches the openings in a direction having a tangential component opposite to that which tends to be imparted to the charge within the cylinder during the initial opening period of the inlet ports, at least one edge of each inlet port which lies substantially parallel to the cylinder axis being inclined so as to assist the tangential entry of the charge in the desired direction.

In testimony whereof I have signed my name to this specification.

HARRY RALPH RICARDO.